US008236072B2

(12) United States Patent
Hobbs

(10) Patent No.: US 8,236,072 B2
(45) Date of Patent: Aug. 7, 2012

(54) SYSTEM AND METHOD FOR PRODUCING SUBSTITUTE NATURAL GAS FROM COAL

(75) Inventor: Raymond Hobbs, Avondale, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 1136 days.

(21) Appl. No.: 11/672,699

(22) Filed: Feb. 8, 2007

(65) Prior Publication Data

US 2008/0190024 A1   Aug. 14, 2008

(51) Int. Cl.
*C10J 3/68* (2006.01)
(52) U.S. Cl. .......................................................... 48/77
(58) Field of Classification Search ............... 48/76, 208, 48/202
See application file for complete search history.

(56) References Cited

U.S. PATENT DOCUMENTS

| | | | | |
|---|---|---|---|---|
| 3,854,896 | A | * | 12/1974 | Switzer et al. ............... 48/210 |
| 3,864,100 | A | * | 2/1975 | Blaskowski ................. 48/73 |
| 3,985,519 | A | | 10/1976 | Kalina et al. |
| 4,900,429 | A | * | 2/1990 | Richardson ................. 208/418 |
| 2004/0144338 | A1 | * | 7/2004 | Goldman ..................... 123/18 R |
| 2005/0064577 | A1 | | 3/2005 | Berzin |

FOREIGN PATENT DOCUMENTS

| | | |
|---|---|---|
| WO | WO2004067933 | 8/2004 |
| WO | WO2006022687 | 3/2006 |
| WO | WO2006127958 | 11/2006 |

OTHER PUBLICATIONS

Tsukahara, K., et al., "Microalgal Cultivation in a Solution Recovered From the Low-Temperature Catalytic Gasification of the Microalga," Journal of Bioscience and Bioengineering, vol. 91, No. 3, 2001, pp. 311-313.
Aresta, et al., "Utilization of Macro-Algae for Enhanced CO2 Fixation and Biofuels Production: Development of a Computing Software for an LCA Study," Fuel Processing Technology, vol. 86, No. 14-15, Oct. 1, 2005, pp. 1679-1693.
Sealock, et al., "Chemical Processing in High-Pressure Aqueous Environments, 5, New Processing Concepts," Ind. Eng. Chem. Res., vol. 35, 1996, pp. 4111-4118.
International Search Report and Written Opinion dated Jul. 15, 2008.

* cited by examiner

*Primary Examiner* — Jonathan Johnson
*Assistant Examiner* — Imran Akram
(74) *Attorney, Agent, or Firm* — Snell & Wilmer, LLP

(57) ABSTRACT

The present invention provides a system and method for producing substitute natural gas and electricity, while mitigating production of any greenhouse gasses. The system includes a hydrogasification reactor, to form a gas stream including natural gas and a char stream, and an oxygen burner to combust the char material to form carbon oxides. The system also includes an algae farm to convert the carbon oxides to hydrocarbon material and oxygen.

17 Claims, 4 Drawing Sheets

SYSTEM AND METHOD FOR PRODUCING SUBSTITUTE NATURAL GAS FROM COAL

GOVERNMENT LICENSE RIGHTS

This invention was made with Government support under DOE Contract No. DE-FC26-06NT42759 awarded by the Department of Energy. The Government has certain rights in this invention.

FIELD OF INVENTION

The present invention generally relates to systems and methods for producing substitute natural gas (SNG) from coal. More particularly, the invention relates to systems and methods for producing SNG using hydro gasification of coal.

BACKGROUND OF THE INVENTION

Because of their relatively high energy density and their current availability, fossil fuels, such as coal, are currently used to supply most of the world's energy requirements. Unfortunately, use of such fuels is thought to generate a substantial portion of the greenhouse gas emissions. Thus, as global demand for energy and awareness of possible environmental damage caused by the use of fossil-fuel energy sources increase, it becomes increasingly desirable to use such energy sources more efficiently, while mitigating any negative environmental effects.

One technique that has been developed for more efficiently using coal and mitigating deleterious environmental effects includes gasification of coal to produce substitute natural gas (SNG). Producing SNG from coal is desirable because the produced SNG can be used in existing natural gas infrastructure (e.g. pipelines, compressor stations, and distribution networks), in commercial applications where natural gas is a feedstock, in domestic applications where natural gas is used for heating and cooking, and in electric utility applications where natural gas is used as a fuel to produce electricity. Coal reserves are substantially greater and more accessible than natural gas supply, and SNG can provide an additional supply of natural gas as the supply of existing natural gas sources diminish. Producing SNG from coal also has the added advantages of providing stability to the supply and thus price of natural gas and of being a higher density, cleaner burning fuel, as compared to coal.

Techniques to gasify coal produce a gas called "syngas," which is a low heating value gas composed of hydrogen and carbon monoxide, and which generally cannot be used as a substitute in natural gas applications, are also generally known. Syngas, also known as municipal gas, has been produced for 100 years in North America. The syngas production releases greenhouse emissions into the atmosphere, and syngas has a much lower heating value (BTU/scf) compared to SNG, which is composed primarily of methane ($CH_4$). Although syngas can be converted into methane, the use of a catalyst is required, and hence a relatively expensive, two step process with low efficiency is required for such conversion.

Although some techniques for gasifying coal and the production of methane or SNG from coal are known, such techniques are relatively poor at capturing potential greenhouse gasses and may be relatively expensive. Accordingly, improved apparatus and techniques for producing SNG and electricity from coal are desired.

SUMMARY OF THE INVENTION

The present invention provides an improved system and method for producing substitute natural gas (SNG) and power from fossil fuels. While the ways in which the present invention addresses the various drawbacks of the prior art are discussed in greater detail below, in general, the invention provides a system including a hydrogasification reactor and an oxygen burner to produce SNG and electricity.

In accordance with various embodiments of the invention, a system for producing SNG and electricity includes a hydrogasification reactor, a hydrogen supply, an oxygen burner, and an oxygen supply. In operation, hydrogen reacts with coal within the hydrogasification reactor to produce a gas stream, including methane, and an ash stream, including solid carbon products. The gas stream is further processed to produce SNG and the solid stream is sent to the oxygen burner to combust the ash stream material to produce heat and carbon oxide(s) (e.g., carbon dioxide). The produced heat can be used to power a stream turbine to produce electricity. In accordance alternative embodiments, the solid stream is sent to a partial oxidation and water shift reactor to convert the ash to carbon dioxide and water.

In accordance with further embodiments of the present invention, a system includes a hydrogasification reactor, an oxygen burner to combust material from the hydrogasification reactor (or a partial oxidation and water shift reactor to convert the ash to carbon dioxide and water), and an algae farm to convert carbon oxide(s) from the oxygen burner to oxygen and solid carbon materials. In accordance with various aspects of this embodiment, the algae used to convert carbon oxides to organic carbon is combusted in the oxygen burner to finish the carbon recycle-fuel recycle. In accordance with further aspects, the system further includes a steam boiler and a steam turbine, and heat produced from the combusted organic carbon provides energy to the boiler which, in turn, produces steam for a steam turbine to produce electricity.

In accordance with yet further exemplary embodiments, the system includes an electrolysis reactor to produce hydrogen and oxygen. In accordance with various aspects of the embodiment, at least a portion of the produced hydrogen and/or oxygen is supplied to the hydrogasification reactor to facilitate methanization of coal.

In accordance with yet further exemplary embodiments of the invention, a method of producing SNG includes providing coal, reacting the coal with hydrogen to form a gas phase including methane and a solid phase, reacting the solid phase with oxygen to produce heat, using the heat to produce steam, using the steam to power a turbine, and producing electricity from the powered turbine. In accordance with various aspect of this embodiment, the method further includes the step of providing algae to convert carbon oxides produced by the system (e.g., the hydrogasification reactor and/or the oxygen burner) to oxygen and feeding dry algae to the oxygen burner. In accordance with yet a further aspect, the method includes the step of electrolyzing water to form hydrogen and oxygen and using at least a portion of the produced hydrogen and oxygen to react with the coal in a hydrogasification reactor and at least a portion of the produced oxygen react with a solid phase in oxygen burner.

BRIEF DESCRIPTION OF THE DRAWINGS

The exemplary embodiments of the present invention will be described in connection with the appended drawing figures in which like numerals denote like elements and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The present invention provides a system and method for producing substitute natural gas (SNG) and electricity from fossil fuels, while mitigating any greenhouse gas emissions. Although the present invention may be used to generate SNG and electricity from a variety of fossil fuels, the invention is conveniently described below in connection with producing SNG and electricity from coal and biofuels. Various forms of coal may be used in accordance with exemplary embodiments of the invention. By way of example, coal (e.g., crushed and pulverized to a fineness of about 70% passing through a 200 mesh sieve (ASTM 200 mesh sieve)) from the Navajo Coal Mine, located in New Mexico, USA, can be used to from SNG and electricity in accordance with the invention.

Figure 1:
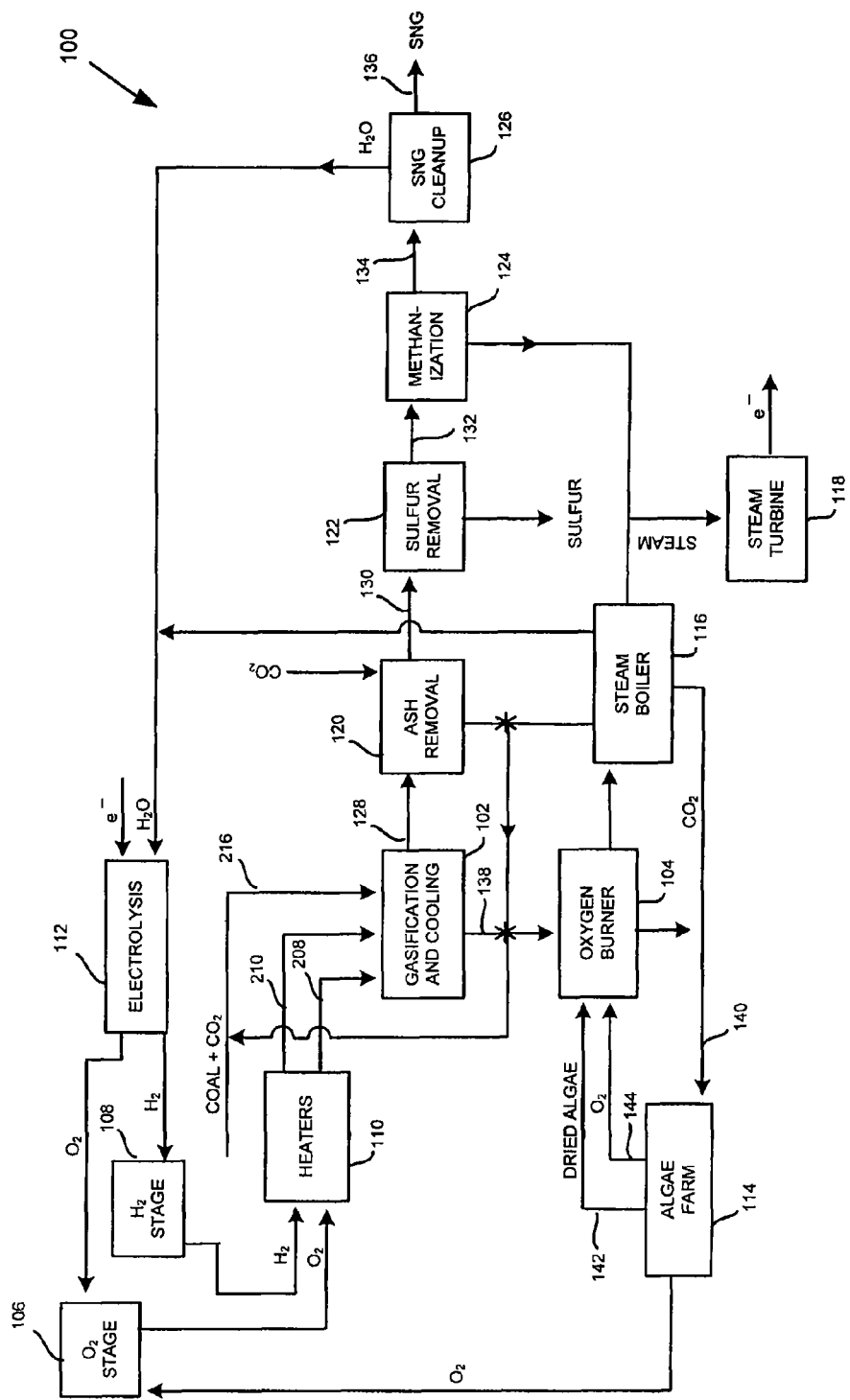
FIG. 1 illustrates a system for producing substitute natural gas and electricity in accordance with various embodiments of the invention.

FIG. 1 illustrates a system 100 in accordance with various embodiments of the invention. System 100 includes a gasification reactor and cooling system 102, an oxygen burner 104 (or, alternatively a partial oxidation and water shift reactor), an oxygen storage/supply unit 106, a hydrogen storage/supply unit 108, heaters 110, an electrolysis reactor 112, an algae farm 114, a steam boiler 116, a steam turbine 118, an ash removal unit 120, a sulfur removal unit 122, a methanation reactor 124, and an SNG cleanup unit 126.

In operation, system 100 produces SNG by reacting coal with hydrogen in the presence of oxygen and optionally recycled carbon dioxide in hydrogasification reactor 102. Crushed and pulverized coal is transported to vessel 202 (using, e.g., horizontally-opposed feed injectors) using $CO_2$ as a carrier. A minimal amount of oxygen is fed to the reactor to maintain a desired temperature (e.g., about 1600° F. to about 1750° F. at about 1000 psi). Gas product 128 from reactor 102 is fed to ash removal unit 120 to remove residual ash from stream 128. Gas stream 130 from ash removal unit 120 is then fed to sulfur removal unit 122 to remove sulfur from stream 130 and produce stream 132. Next, stream 132 is fed to methanation reactor 124 to further convert residual gases in stream 132 to methane and produce stream 134. Stream 134 is then fed to SNG cleanup unit 126 to produce clean SNG stream 136.

Referring back to gasification reactor 102, ash stream 138 from the reactor is fed to oxygen burner 104 to convert unreacted solid carbon materials to carbon oxides and heat for boiler 116 (alternatively, ash stream 138 may be fed to a partial oxidation and water shift reactor). Carbon oxides produced by burner 104, partial oxidation and water shift reactor, and/or boiler 116 are fed to algae farm 114 via stream 140. Farm 114 converts the carbon oxide materials to algae and oxygen. As illustrated, a portion of the dry algae and oxygen produced by farm 114 can be fed back to oxygen burner 104 via streams 142, 144, respectively. In addition, oxygen can be sent to oxygen storage unit 106 and/or to reactor 102 to assist with the hydrogasification reaction.

Figure 2:
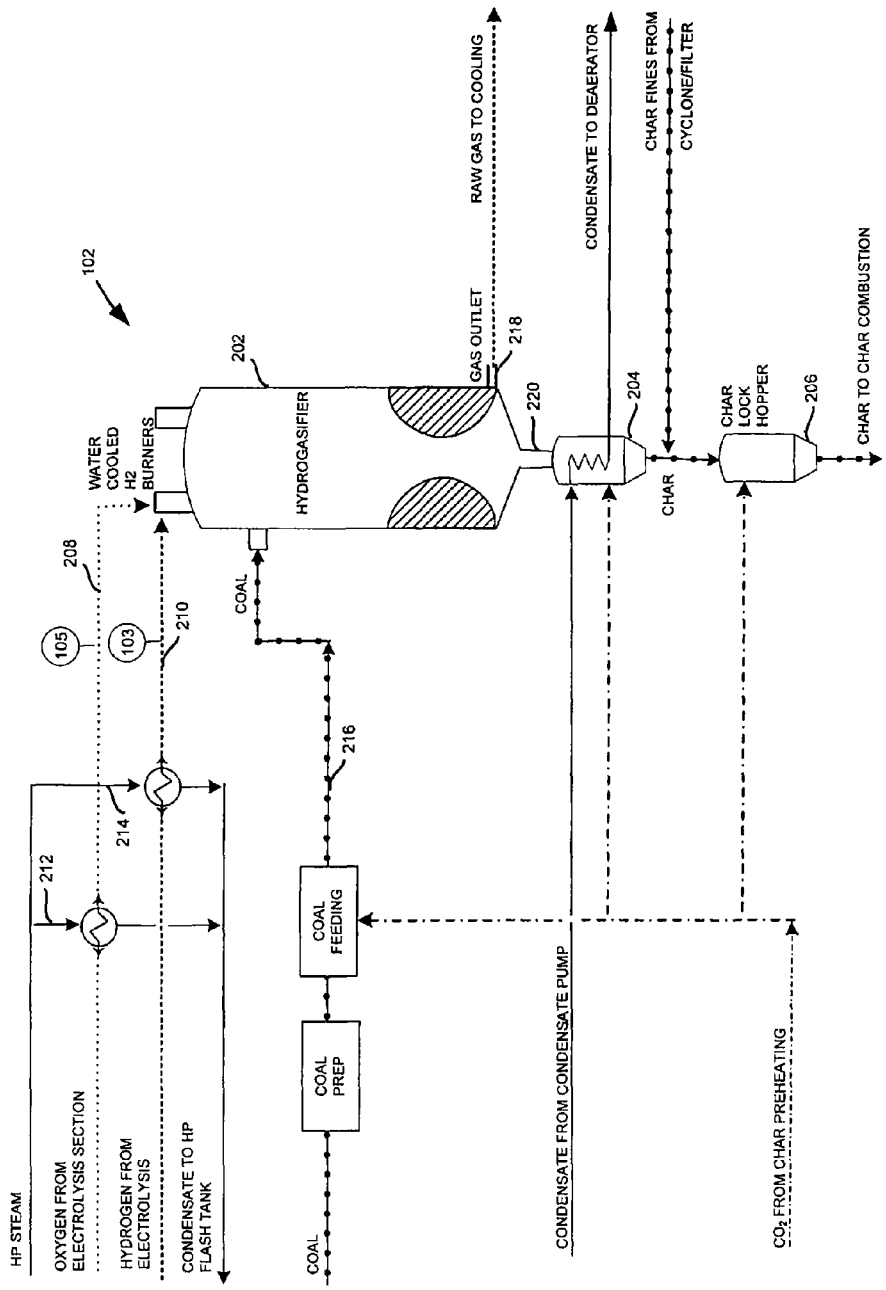
FIG. 2 illustrates a hydrogasification reactor and cooling system of the system of FIG. 1 in greater detail.

FIG. 2 illustrates hydrogasification reactor and cooling system 102 in greater detail. As illustrated, hydrogasification reactor and cooling system 102 includes a hydrogasification chamber 202, a first char lock hopper and cooler 204, and a second char lock hopper 206.

Chamber 202 is configured to react coal, hydrogen, and oxygen to form methane and byproducts. In accordance with one exemplary embodiment, gasifier or chamber 202 is a refractory-lined vessel, having an internal L/D (length/diameter) ratio of about 10-100. The bottom third of the gasifier is shaped with steel and refractory blocks such that a converging-diverging section is formed. These overall internal dimensions of the gasifier yield an approximate volume of 900 cubic feet.

Gasifier 202 also includes hydrogen/oxygen tip burners located on or near the top of reactor 202. In accordance with one particular example of the invention, gasifier 202 includes four burners that are arranged tangentially from one another at about 90 degree angles. During operation, the burners combust hydrogen in the presence of oxygen. A minimum amount (e.g., about 3 vol %) of oxygen is burned to yield a high temperature (about 1,200° F. to about 1,600° F.) hydrogen-rich gas stream and generate a small amount of water vapor. The burners are cooled by a circulating water system with external indirect heat exchange to cooling water or other suitable heat sink.

In further accordance with an exemplary embodiment of the invention, oxygen is introduced from a line 208 and hydrogen is introduced from a line 210 (e.g., in a downward direction) into reactor 202, such that the partial hydrogen is burned. Steam can also be added to the hydrogen and oxygen via lines 212 and 214, respectively. The pulverized coal is injected via line 216 at a 45° upwards angel into the hydrogen-rich gas stream. In accordance with one example of the invention, four coal injectors, arranged 90 degrees from one another, are used to inject the coal. The injectors may optionally be cooled with an external cooling water loop similar to that of the hydrogen partial oxidation burners.

Gas and particles travel the length of the vessel, converging and accelerating, and then diverging and de-accelerating in the bottom third of the reactor. This motion is thought to focus the path of the pulverized particles towards the bottom of the gasifier and into the char hopper system, discussed in more detail below. Gaseous components such as $CH_4$, $H_2$, $N_2$, $H_2S$, and HCl, exit from an outlet nozzle 218 located at or near the terminus of the diverging zone.

Figure 3:
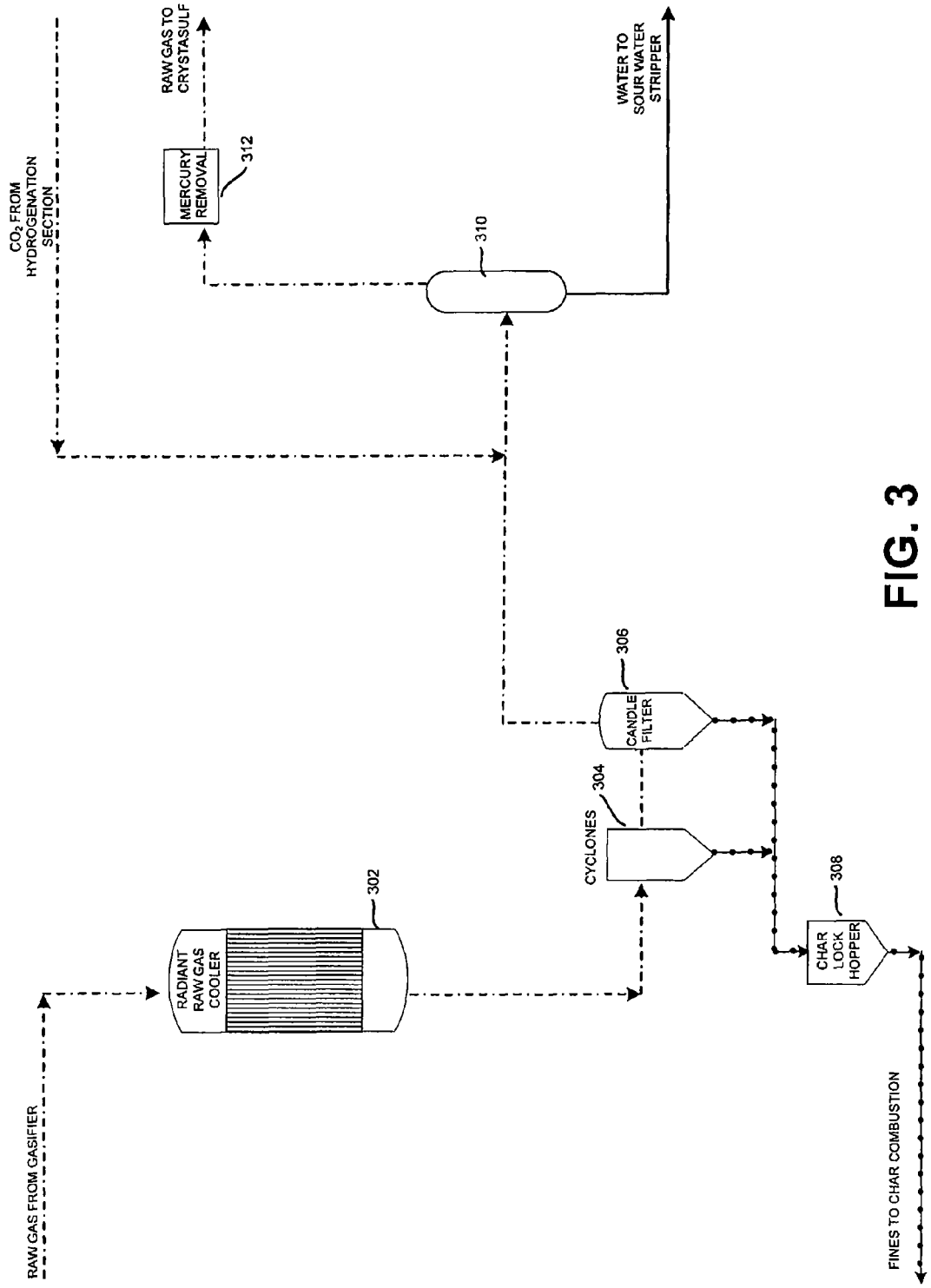
FIG. 3 illustrates gas stream cooling and purification stages of the system illustrated in FIG. 1.

Referring momentarily to FIG. 3, the crude raw gas leaving hydrogasifier 202 at approximately 1600° F. contains a small quantity of unburned carbon and a significant portion of ash. This gas stream is cooled in a radiant boiler 302 for heat recovery via high-pressure saturated steam generation. The partially cooled gases pass through cyclones 304 and a candle filter 306. The cleaned gas is then further cooled in feedwater heaters 310 and piped to a mercury removal system 312. The entrained ash is separated after the cooling. Ash is removed from cyclones 304 and candle filter 306 drains to a collecting hopper, from which it passes into a lock hopper pressure letdown system 308. The ash is then fed to the oxygen burner 104.

Mercury removal unit 212 is configured to remove Hg from the cooled gas stream. In accordance with one example of the invention, unit 212 is designed with a bed of sulfur-impregnated activated carbon with approximately a 20-second superficial gas residence time, which achieves more than 90 percent reduction of mercury in addition to the removal of some portion of other volatile heavy metals such as arsenic.

After mercury removal treatment, the gas is sent to sulfur removal unit 122. A non-aqueous sulfur recovery process that removes hydrogen sulfide and $SO_2$ from gas streams and converts it into sulfur, such as that developed by CrystaTech, Inc. under the name CrystaSulph, is one exemplary process that can be used with the present invention. The CrystaSulf process uses a hydrophobic solution to dissolve elemental sulfur and employs operating conditions that promote liquid-phase conversion of $H_2S$ and $SO_2$ to elemental sulfur.

$H_2S$ is removed from the sour gas in a tray countercurrent absorber, where $H_2S$ reacts with dissolved sulfur dioxide in the circulating CrystaSulf scrubbing solution according to the Claus liquid process reaction to produce dissolved elemental sulfur. The CrystaSulf solution has a high solubility for sulfur, which remains dissolved at the process operating temperature. The sweet gas from the absorber exits the system.

Once sulfur is removed, the gas stream is fed to methanation unit 124 to convert carbon oxides (CO and $CO_2$) in the gas stream to $CH_4$ using, e.g., a methanation block including a catalytic reactor cooled by a series of heat exchangers with steam evaporative surfaces and a steam drum. Heat released during the methanation reaction can be used for generation of high pressure saturated steam, which can be used for steam turbine 118 in system 100.

Methanation reactor 124 catalyst generally requires a very low sulfur level to prevent poisoning. In accordance with various aspects of the invention, a guard bed of zinc oxide absorbent is installed upstream of methanation reactor 124 to protect methanation catalyst from poisons. The zinc oxide guard bed removes traces of sulfur and droplets of liquid from the gas stream.

After methanation, methane-rich stream 134 is cooled and dried and any excess $H_2$ is removed at cleanup unit 126. The gas is compressed to make final SNG product 136. In accordance with one particular example, the cooled raw SNG is flashed to remove condensed water, and the raw SNG is dehydrated with glycol. The dried, raw SNG is sent to a membrane unit where about 85% of the hydrogen is removed by permeation from the raw SNG. The removed hydrogen can be compressed to about 70.7 bara (1,025 psia) for recycle to the hydrogasifier. The purified raw SNG stream is compressed to 60.3 bara (875 psia) for injection to a natural gas pipeline.

Referring back to FIG. 2, solids from reactor 202 exit through outlet 220 and are sent to char lock hopper and cooler 204 to cool the char to a temperature of about 500° F. The solids are then transported to char lock hopper 206 to depressurize the char to atmospheric pressure before processing at oxygen burner 104 (or a partial oxidation and water shift reactor).

Figure 4:
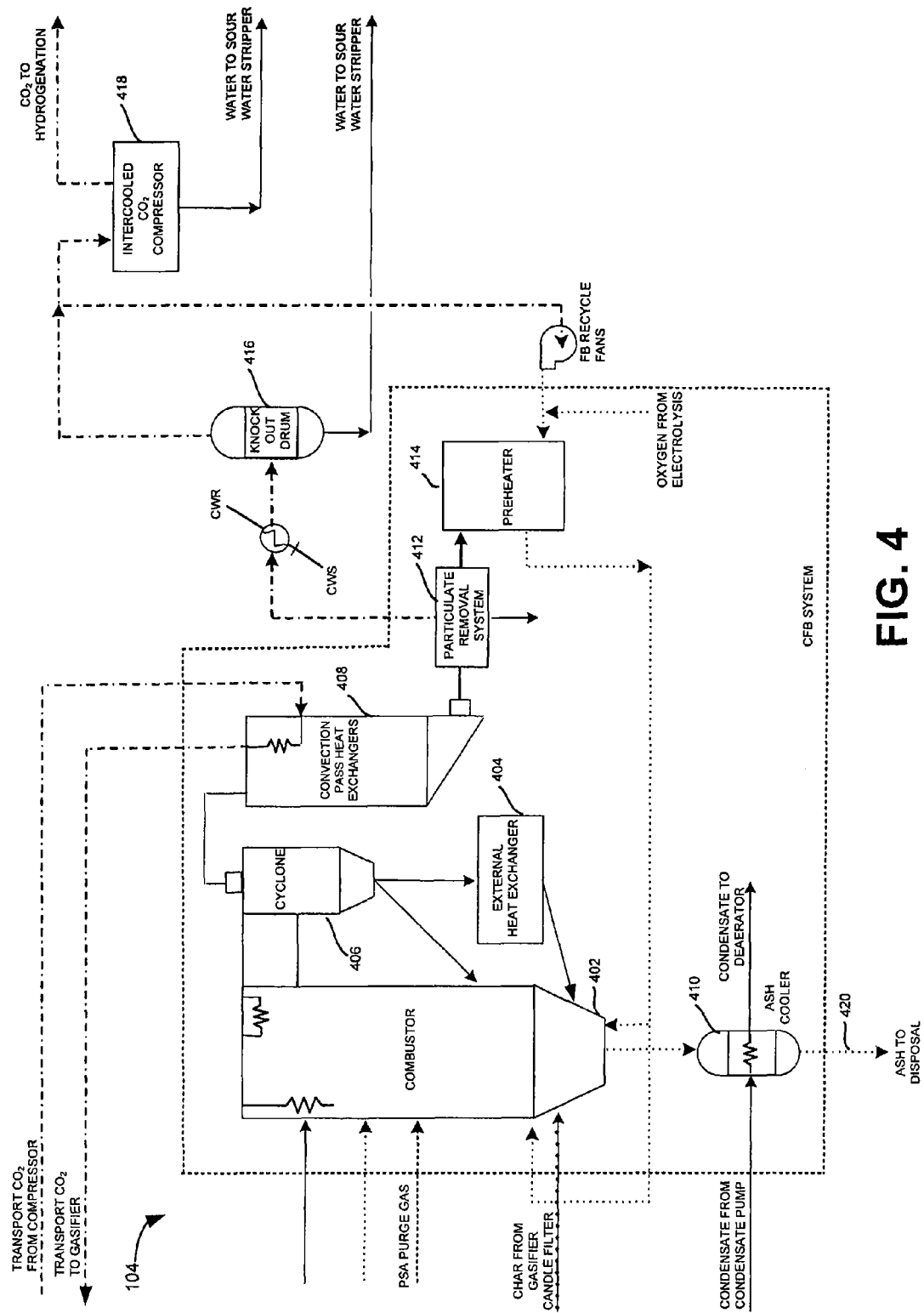
FIG. 4 illustrates portion of the char combustion portion of the system illustrated in FIG. 1.

Turning now to FIG. 4, oxygen burner 104 will be described in greater detail. Oxygen burner 104 includes a combustion reactor 402 (e.g., a fluidized-bed, oxygen-blown combustor or an oxygen-blown gasifier), an external heat exchanger 404, and a convection heat exchanger 408. System 100 also includes a cyclone 406 coupled between reactor 402 and convection pass heat exchangers 408, an ash cooler 410 to cool residual ash from reactor 302, a particulate removal system 412, a preheater 414, a knock out drum 416, and an intercooled $CO_2$ compressor 418

In operation, char residue from hydrogasifier 102 along with the particulate matter removed by the cyclone 406 and candle filter 306 are fed to reactor 402 to produce carbon oxides (mostly $CO_2$) and residual char. In accordance with one example, about 10% excess oxygen is used to ensure a desired level of combustion. Reactor 402 may operate at about 1500° C. (2732° F.) at 2.0 bara (29.4 psia).

Cooling is generally required to maintain this temperature. Slag is removed in stream 420. The vapors are cooled to 150° C. (302° F.) before entering a hydrotreater (not shown) where they are contacted with high purity, low pressure hydrogen to consume the excess oxygen and convert any $SO_2$ to $H_2S$. These are highly exothermic reactions and heat must generally be removed from the hydrotreater reactor. The hydrotreater effluent is cooled to 40° C. (104° F.). In accordance with various aspects of the invention, as discussed in more detail below, the thermal and chemical energy in the char supplies energy to raise steam (e.g., 1800 psig/1000° F.) for the steam turbine 118.

The cooled ash combustor flue gas can be flashed to remove condensed water. As noted above, the $CO_2$ rich recycle stream can be used to blow the coal into the hydrogasifier, and the flow rate of this stream can be set to about 20 wt % of the coal rate. The remaining ash combustor vapor stream is compressed to about 70.7 bara (1,025 psia) in a multistage compressor with liquids removal. Various portions of the produced $CO_2$ can also be sent to reactor 202 and/or sent to algae farm 114.

As noted above, reactor 104 can be used to produce head for steam boiler 116, which powers turbine 118. In accordance with particular examples, steam turbine 118 is designed for a long-term operation (90 days or more) at maximum continuous rating (MCR) with throttle control valves 95% open and is capable of a short-term, five-percent over pressure/valves wide open (the SOP/VWO) condition (16 hours). By way of particular example, steam turbine 118 is a tandem compound type, consisting of HP-IP-two LP (double flow) sections enclosed in three casings, designed for condensing single reheat operation, and equipped with non-automatic extractions and four-flow exhaust.

Referring back to FIG. 2, electrolysis unit 112 may be used to form at least a portion of the hydrogen and/or oxygen used in system 100. In accordance with one example, water at about 25° C. (77° F.) is pumped to a pressure of 6.9 bara (100 psia) and sent to the electrolysis cell where the chemical bonds are broken, and the pure hydrogen and oxygen are produced. The electrolysis process has an energy efficiency of 75% and has a 500 psi exit pressure for hydrogen and oxygen. The pure hydrogen in compressed to about 70.7 bara (1025 psia) and sent to storage unit 108. In contrast, most of the oxygen is required at low pressure, so the oxygen may be shipped to storage 106 at low pressure and be compressed at the gasification facility. Any surplus oxygen produced by unit 112 can be sold to produce additional revenue.

As noted above, an advantage of the present invention is that the system and method can be used to produce SNG and electricity, while mitigating production of any greenhouse gasses. One technique used to mitigate greenhouse gasses production is to capture and convert carbon oxides (e.g., $CO_2$) to oxygen and solid carbon materials, which can be used as fuel in burner 104, using bioreactor 114.

Bioreactor or algae farm 114 may be configured to facilitate growth of a variety of materials. For example, bioreactor 114 may include algae that converts $CO_x$ to oxygen and hydrocarbon material. The hydrocarbon material can be sequestered or used as fuel or other purposes. In accordance with various aspects of this exemplary embodiment, bioreactor 104 includes algae, which converts $CO_x$ (e.g., product from oxygen burner 104 or partial oxidation and water shift reactor) to oxygen and hydrocarbon materials, which can be processed into biodiesel, ethanol, protein, and the like. As noted above, the spend hydrocarbons, or at least a portion thereof, can be used as fuel for burner 104.

The following non-limiting, illustrative example illustrates various conditions suitable for use with system 100 in accordance with various embodiments of the invention. This example is merely illustrative, and it is not intended that the invention be limited to the illustrative example.

|  | Coal Feed | H$_2$ Feed | O$_2$ Feed | SNG |
|---|---|---|---|---|
| Stream Temp., ° C. | 216 20 | 210 135 | 208 135 | 136 42.1 |
| Pressure, bar | 1 | 70.7 | 70.7 | 60.3 |
| Flow, kg/hr | 40,763 | 9,451 | 5,327 | 32,355 |

Although exemplary embodiments of the present invention are set forth herein, it should be appreciated that the invention is not so limited. For example, although the systems are described in connection with various process parameters, the invention is not so limited. Various modifications, variations, and enhancements of the system and method set forth herein may be made without departing from the spirit and scope of the present invention as set forth in the following claims and their equivalents.

I claim:

1. A system for producing substitute natural gas and electricity, the system comprising:
    a hydrogasification reactor for reacting hydrogen with coal;
    a gas product stream comprising methane in fluid communication with the hydrogasification reactor;
    an ash stream in communication with the hydrogasification reactor;
    an electrolysis reactor;
    a hydrogen source coupled to the hydrogasification reactor and the electrolysis reactor;
    a coal source coupled to the hydrogasification reactor;
    an oxygen burner, to react the ash stream with oxygen, coupled to an outlet of the hydrogasification reactor;
    an oxygen source coupled to the oxygen burner and the hydrogasification reactor;
    and an algae farm coupled to an output of the oxygen burner.

2. The system for producing substitute natural gas and electricity of claim 1, wherein the algae farm includes material to convert carbon oxides from the oxygen burner to hydrocarbon material and oxygen.

3. The system for producing substitute natural gas and electricity of claim 2, wherein the hydrocarbon material provides fuel to the oxygen burner.

4. The system for producing substitute natural gas and electricity of claim 3 wherein the electrolysis reactor provides hydrogen to the hydrogen source and oxygen to the oxygen source.

5. The system for producing substitute natural gas and electricity of claim 1, wherein oxygen is reacted with hydrogen in the hydrogasification reactor to produce an operating temperature between about 1600° F. and 1750° F.

6. The system for producing substitute natural gas and electricity of claim 1, further comprising a steam boiler coupled to the oxygen burner.

7. The system for producing substitute natural gas and electricity of claim 6, further comprising a steam turbine coupled to the steam boiler.

8. The system for producing substitute natural gas and electricity of claim 1, further comprising an ash removal unit, coupled to the hydrogasification reactor, to remove residual ash from the gas stream.

9. The system for producing substitute natural gas and electricity of claim 8, further comprising a sulfur removal unit, coupled to the ash removal unit, to remove sulfur from the gas stream.

10. The system for producing substitute natural gas and electricity of claim 9, further comprising a methanization reactor, coupled to the sulfur removal unit, to convert residual gases in the gas stream to methane.

11. The system for producing substitute natural gas and electricity of claim 1, further comprising a first char hopper coupled to an outlet of the hydrogasification reactor.

12. The system for producing substitute natural gas and electricity of claim 11, further comprising a second char hopper coupled to the first char hopper and the oxygen burner.

13. The system for producing substitute natural gas and electricity of claim 10, further comprising a cleanup unit, coupled to the methanization reactor, to remove excess hydrogen from the gas stream.

14. A system for producing substitute natural gas arid electricity, the system comprising:
    a hydrogasification reactor for reacting hydrogen with coal;
    a gas product stream comprising methane in fluid communication with the hydrogasification reactor;
    an ash stream in communication with the hydrogasification reactor;
    an electrolysis reactor;
    a hydrogen source coupled to the hydrogasification reactor and the electrolysis reactor;
    a coal source coupled to the hydrogasification reactor;
    an oxygen burner, to react the ash stream with oxygen, coupled to an outlet of the hydrogasification reactor;
    an oxygen source coupled to the oxygen burner and the hydrogasification reactor;
    an algae farm coupled to an output of the oxygen burner;
    a steam boiler coupled to the oxygen burner;
    a steam turbine coupled to the steam boiler;
    an ash removal unit, coupled to the hydrogasification reactor, to remove residual ash from the gas stream;
    a sulfur removal unit coupled to the ash removal unit, to remove sulfur from the gas stream; and
    a methanization reactor, coupled to the sulfur removal unit, to convert residual gases in the gas stream to methane.

15. The system for producing substitute natural gas and electricity of claim 14, further comprising a first char hopper coupled to an outlet of the hydrogasification reactor.

16. The system for producing substitute natural gas and electricity of claim 14, further comprising a second char hopper coupled to the first char hopper and the oxygen burner.

17. The system for producing substitute natural gas and electricity of claim 14, further comprising a cleanup unit, coupled to the methanization reactor, to remove excess hydrogen from the gas stream.

* * * * *